Feb. 27, 1934.  M. SMOLENSKY  1,949,190
STRAIGHT FLOW STOP VALVE
Filed May 1, 1930   3 Sheets-Sheet 1
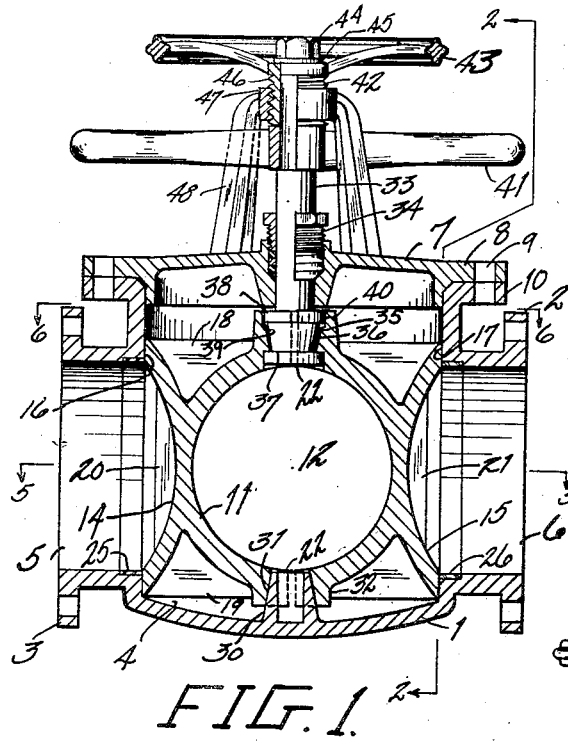

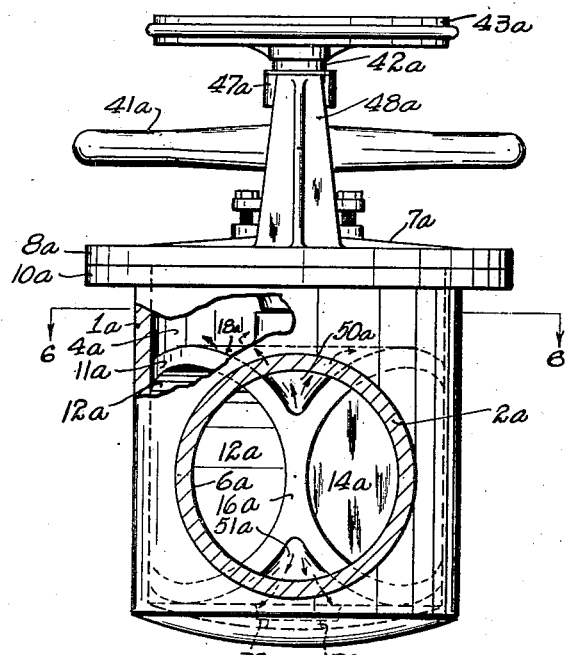
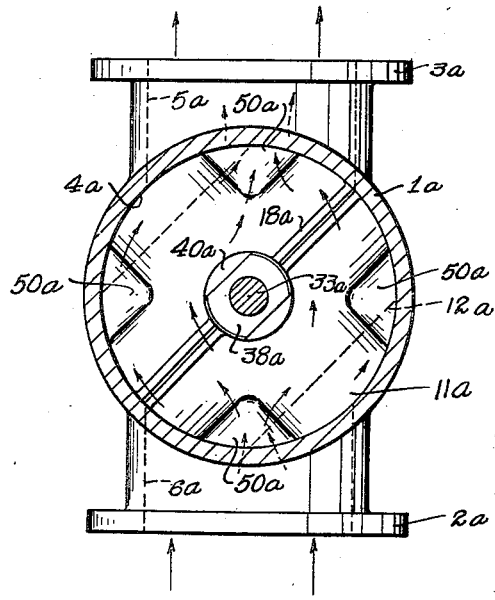

Feb. 27, 1934.  M. SMOLENSKY  1,949,190
STRAIGHT FLOW STOP VALVE
Filed May 1, 1930   3 Sheets-Sheet 3

Inventor
Michael Smolensky,
By Justin W. Macklin.
Attorney

Patented Feb. 27, 1934

1,949,190

UNITED STATES PATENT OFFICE 1,949,190

STRAIGHT FLOW STOP VALVE

Michael Smolensky, Cleveland, Ohio

Application May 1, 1930. Serial No. 448,838

9 Claims. (Cl. 251—102)

This invention relates to stop valves. The stop valves now generally used, such as the gate and disk valves, are rather bulky and expensive, and require careful fitting of the parts for efficient operation. Furthermore, the arrangement of the parts is such that the flow of the liquid or fluid through the valve is impeded and frictional losses are very high.

It is one of the objects of my invention to eliminate these frictional losses by means of a valve which is very compact and durable, yet which will operate effectively under varying conditions of use and throughout a wide range of pressures.

A more specific object of my invention is to permit straight or direct flow of the fluid or liquid through the valve by providing a passage therein such that when the valve is open, an unobstructed passage through the valve, having as large a diameter as the pipe line and forming practically an integral section of the pipe line, results.

Another object of my invention is a relatively small valve which may be easily and quickly operated, yet will seal effectively against extremely high pressures.

A further object of my invention is a valve which lends itself to economical manufacture and assemblage in either large or small quantities.

Another desirable feature of my invention is that the same construction may be used economically in valves of any size and for any pressures, the only change necessary being a proportional reduction of the dimensions of the various parts.

Further, in valves constructed in accordance with my invention, the step of grinding the seating portions is eliminated, a comparatively smooth machined finish being sufficient for effective operation. This not only greatly reduces production costs but also renders the parts of the same sizes of valves freely interchangeable with a consequent reduction in cost of replacement and a saving in time and stock necessary for servicing.

My invention briefly contemplates a hollow valve body, which is adapted for connection in a pipe line and in which is mounted a plug, divided into sections and having a central bore of substantially the same diameter as the pipe line with which the valve is to be associated.

The parts are so arranged that when the plug bore is axially aligned with the pipe openings in the body, the sections of the plug may be spread apart so as to engage the portions of the inner walls of the body tightly, thus forming practically a full diameter pipe directly through the valve. By relieving the spreading action and rotating the plug, for instance, a quarter of a turn, the solid walls of the plug lie over the pipe openings in the body. The sections of the plug may then be spread apart again so that they tightly engage the inner walls of the valve body and effectively seal the openings.

A convenient form and arrangement of parts which have effectively accomplished these results will be more fully described in the following specification, in which reference is made to the drawings, reference numerals being used to designate the various parts in the different views.

In the drawings—

Fig. 1 is a sectional view of a valve embodying my invention the reinforcing ribs being shown in elevation for purposes of clearness in illustration.

Fig. 2 is a sectional view of another form of valve embodying my invention.

Fig. 3 is a plan view of a plug and operating lug of a valve such as illustrated in Fig. 1.

Fig. 4 is a plan of the same plug illustrating a modified arrangement of the operating lug.

Fig. 5 is a sectional view of the valve illustrated in Fig. 2 with the plug revolved to a different position.

Fig. 6 is a sectional view of the valve illustrated in Fig. 5 and is taken on a plane indicated by the line 6—6 of Fig. 5.

Figure 8:
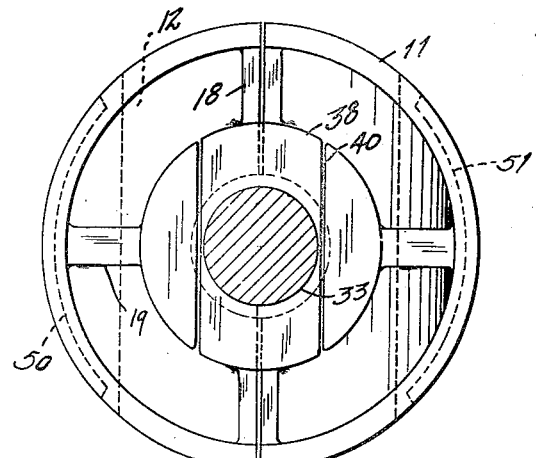
Fig. 8 is a plan view of the plug and operating lug illustrated in Fig. 7.

A preferred form of stop valve embodying my invention includes a valve body 1, provided with suitable means, such as flanges 2 and 3, for connecting the valve in a pipe line. The body has a hollow bore 4, preferably cylindrical, which may be closed at one end by the walls of the body, and communicating openings such as 5 and 6, preferably of the same diameter as the diameter of the pipes of the line with which the valve is to be associated, to permit unrestricted passage of the fluid or liquid in the line through the valve. The upper end of bore 4 is sealed by a plate 7, having an annular flange 8 provided with holes 9 aligned with holes in a complementary flange 10 on the valve body and adapted to receive bolts for securing the plate 7 tightly on the valve body.

To open and close the openings 5 and 6, I provide a closure plug 11 within the bore 4 of the valve body. This plug is preferably in the form of a cylinder fitting the inner walls of the bore 4, and capable of being rotated about its own axis within the bore 4. The plug is provided with a central bore 12, of substantially the same diameter as the openings 5 and 6, and is capable of being rotated so as to bring the bore 12 into axial alignment with the openings 5 and 6 to form a straight unrestricted passage from one of the openings to the other through the valve.

It is desirable that the plug 11 be capable of being easily turned within the bore 4 to open and close the openings 5 and 6, and yet be made to seat tightly to seal the openings 5 and 6 when desired. To accomplish these results, the lateral surface of the plug and the side walls of the bore 4 may be machined to comparatively smooth complementary surfaces, and the plug formed or split preferably into two separate sections along a plane through its axis and the axis of its central bore 12, as indicated at 22. The space between the sections is such that the two sections may be drawn together to cause a slight clearance between the plug 11 and the inner walls of the central bore 4 of the body 1.

Obviously, when the plug 11 is thus contracted, it may be rotated freely in the bore 4. Further, when the plug is rotated so that the blank wall portions are aligned with the openings 5 and 6, and the two sections of the plug are wedged apart and firmly against the walls of the bore 4, a tight effective seal of the openings is provided. To insure better seating of the blank wall portions, shallow cavities, such as 14 and 15, having slightly greater diameters than the openings 5 and 6, may be molded or otherwise provided in the plug 11. These cavities should be so positioned that they may be brought into alignment concurrently with the openings 5 and 6 respectively.

In this manner any tendency of the edges of the body about the openings 5 and 6 to cut or roughen the surface of the plug is eliminated and smooth seating areas 16 and 17 are formed on the plug.

Experience has proven that if the contact surfaces of the plug and the bore 4 are machined by the usual methods, a very effective seal is provided and grinding of the seating areas for fitting is unnecessary. However, the walls of the passages 5 and 6 may be cut back and rings 25 and 26 of suitable wearing material inserted to form a seat for the seating areas 16 and 17 and for the seating portions of the plug about the entrance of the central bore 12.

In the larger size valves, the plug 11 may be formed with radial ribs 18 and 19, as illustrated, and the walls between the cavities 14 and 15 and the central bore 12 may also be strengthened by ribs such as 20 and 21, thus effecting a substantial saving in material.

In order that the sections of the plug 11 may be rotated and tightened in the desired position, a pivotal wedge preferably in the form of a frustro-conical lug 30 may be provided in the body 12, coaxial with the central bore 4, and rigid with the body 1. The end of the plug 11 adjacent to the lug 30 is tapped as at 31, to receive the lug 30, the plug being reinforced by a shoulder such as 32, when necessary.

Mounted in the closure plate 7 and axially aligned with the plug 11 is an operating stem 33, the stem opening being sealed by suitable packing held in place by a screw plug 34 or a plug such as illustrated in Fig. 2. The stem 33 is rotatable relative to the plate 7 and slidable axially therethrough. The inner end of the stem 33 is provided with an operating lug 35, rigid therewith. The lug 35 has a central frustro-conical portion 36, the lower end terminating in an enlarged portion forming an annular shoulder 37. The upper end of the lug 35 is formed with projecting shoulders 38.

If desired, the shoulders 38 may be positioned so as to bridge across the sections of the plug 11, as illustrated in Fig. 3, thus eliminating any tendency of the lug 38 to wedge the sections apart as it rotates the plug 11.

An internal bore 39, having sloping side walls complementary to the frustro-conical portion 36 of the operating lug 35, is provided in the upper portion of the plug 11. Recesses 40 are provided on the plug 11 and cooperate with the shoulders 38 of the lug, as it is rotated, to rotate the plug.

Obviously, as the shaft 33 is moved relatively toward the plug 11, the sloping walls of the frustro-conical portion 36 of the lug engage the complementary walls of the bore 39, wedging the sections of the plug 11 relatively apart and tightly against the walls of the bore 4. A similar and additional wedging action results from the engagement of the frusto-conical lug 30 and bore 31. Thus the plug 11 may be seated with a very small axial movement of the lug. It should be noted, however, that if conditions should arise under which the plug 11 must be more carefully positioned axially, this may be accomplished by forming in inverted positions the frustro-conical lugs 30 and 36 and also the complementary surfaces 31 and 39 of the plug 11, so that the wedging action is obtained as the stem 33 and plug 11 are moved relatively apart. Sufficient clearance must be left between the underside of the shoulders 38 and the upper end of the bore so that the wedging action of the conical portion 36 of the lug 35 is not impeded. The plug 11 is recessed to form an internal annular shoulder adapted to engage the shoulder 37 of the operating lug 35, so that the plug 11 may be lifted from the lug 30 to relieve the wedging action for rotating the plug from open to closed positions.

In order to rotate the shaft 33 for turning the plug 11 to open or closed positions, a handle such as indicated at 41, may be rigidly secured on the stem. However, in very large size valves, reduction gearing may be necessary for this purpose. In the arrangement illustrated, a quarter turn of the plug 11 is all that is necessary to open or close the valve. To move the shaft axially for wedging the sections of the plug 11 apart in the open or seated positions, as desired, a sleeve 42 having a handle 43, is mounted on the stem 33, relatively rotatable thereto, and secured by a suitable bolt 44 and collar 45. The sleeve 42 is threaded, as at 46, to engage complementary threads in a collar 47, which may be supported on legs 48 rigid with the plate 7. In the form illustrated, the legs 48 act also as a stop for the handle 41, so that it may be turned only enough to bring the plug and openings in proper operating positions.

Figure 7:
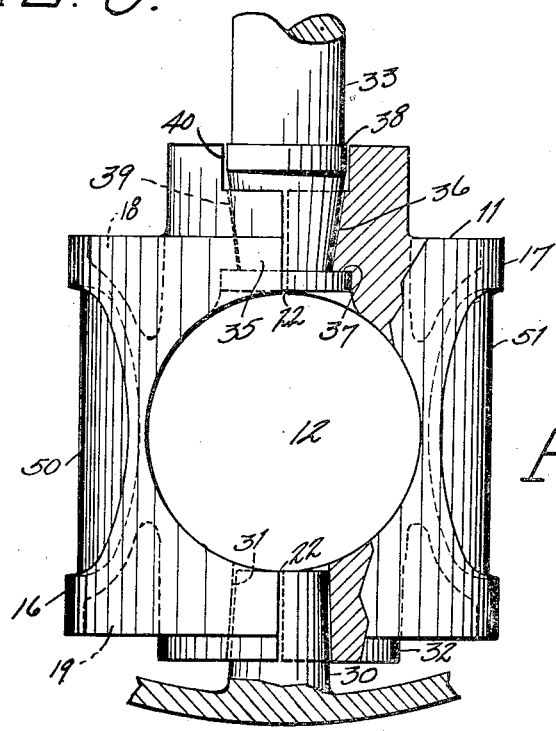
Fig. 7 is an elevation of a modified form of the valve plug illustrated in Fig. 1, more clearly illustrating the valve operating lug and stem, portions thereof being shown in section for clearness.

If desired, the sealing portions of the plug 11 may be formed as illustrated in Fig. 7. In such case, the plug may be molded with the portions such as 50 and 51 offset inwardly, the inset surface being in effect portions of a cylinder coaxial with the plug 11.

Referring to the form of valve illustrated in Figs. 2, 5 and 6, the plug 11a is substantially cylindrical and has a transverse bore 12a preferably circular. Except for the plug 11a, the parts of the valve illustrated in Figs. 2, 5 and 6 are substantially the same as the corresponding parts of the valve illustrated in Fig. 1, and the parts therefore are designated by the same numerals with the suffix "a" added to designate the particular figures to which reference is made. The description of such parts is clear from the description of Fig. 1 and consequently the plug 11a only need further be described. The plug 11a is split along a plane defined by the axis of the bore and the plug axis. At least one-half and preferably each half of the plug has a sufficiently large solid area to completely block the opening into the valve body. In order that the plug may seat effectively, annular seating areas 16a are formed on the plug surfaces about the ends of the bore 12a and on the solid areas of the plug. The seating areas 16a on the solid plug portions are preferably offset 90° from the axis of the bore 12a and each has an inner diameter substantially equal to that of the bore 12a.

The seating areas may be formed by making circular depressions 14a of proper diameter in the face of solid plug portions. The outer diameters of the seating areas are slightly larger than the diameters of the depressions so as to provide a seating area of substantial radial width intermediate the seating areas. The ends of the plug are notched radially as indicated in 51a, these notches sloping upwardly and inwardly from the cylindrical surface of the plug. In the form illustrated, the side walls of the notches are preferably cylindrical surfaces concentric with the seating areas and substantially the same diameter as the outer diameters thereof. The notches so formed taper inwardly.

The purpose of the notches 50a and 51a may be better understood by reference to Figs. 5 and 6. As there illustrated, the notches provide auxiliary passages through the valve bore and around the plug when the plug is being opened or when it is intermediate its opening and closing position.

To insure communication between the passages thus formed and the body passages, the outer extremity of each of the notches should be deep enough to project partially across the body passages 5a and 6a when brought opposite thereto, as illustrated in Fig. 5. Other means of forming such auxiliary passages may be used, though the notches described have proven very efficient and make possible economies in forming the plug.

When the valve plug is loosened and rotated to present the notches to the passages 5a and 6a the water or fluid rushes as a swiftly moving regurgitating stream around the plug following approximately the direction indicated by the arrows in Figs. 5 and 6. This stream of water stirs and carries foreign matter out from the body bore and from about the plug, thus flushing the plug thoroughly at each operation. The same construction assists in the flow of fluid around the plug when the spreading pressure is relieved and thereby renders the plug more easily rotatable.

While I have described and illustrated my invention in connection with a valve having a cylindrical bore and plug, obviously various changes may be made in the different parts without departing from my invention. For instance, the valve body and plug might be made globular in form, rather than cylindrical, or the wedges may be made with flat walls and rotatable with the plug, rather than frustro-conical.

In the larger valves it might even be desirable to force the sections of the plug apart by means of screws normal to the stem, rather than by wedging action. Experience has proven that a valve such as illustrated, machined to a fit and not ground, can be so tightly seated by the wedging action that it will effectively seal gas or water lines under exceedingly high pressures, the plug being actually distorted to fit the seating areas in the body, if necessary.

I claim:

1. A stop valve comprising a body having a cylindrical central bore and coaxial passages of circular cross-section communicating said bore and a pipe line positioned on diametrically opposite sides of said central bore, a cylindrical plug within said central bore having a straight passage therethrough of the same size and cross sectional shape throughout substantially its entire length as the said coaxial passages and adapted to be placed in axial alignment therewith in one position of said plug, said plug being split into two sections by a plane defined by its axis and the axis of the passage therethrough, and each of said sections having solid portions alignable one with each of said body passages in another position of said plug, means extending outside of said valve body for moving said plug sections to said positions, and other means to spread said plug sections relatively apart and into stressed engagement with the walls of the central bore of the body in either position of said plug.

2. A valve comprising a valve body having a central bore and passages communicating said bore and a pipe line, a split closure plug rotatable in said bore and spaced from the ends thereof and having a passage therethrough and a closure area, said plug passage being alignable with said body passages when the plug is rotated to one position and said closure area lying over one of said body passages to close the same when the plug is rotated to another position, notches in each end of said plug communicating said body passages and said bore outside of said plug and around the ends thereof when the plug is in another position, and means to rotate said plug in said body bore, and means to spread said plug sections relatively apart in the closing position of said plug and means for moving the plug sections axially in said bore.

3. In a valve, a body, an expansible split plug mounted within the body, the body and plug having passages adapted to be brought into and out of communication upon turning the plug to predetermined positions in the body, an operating stem for the plug, said stem being rotatable and axially movable relative to the plug independently of rotation thereof, means connecting the stem with the plug to expand the plug in the body upon one axial movement of the stem and to release the expanding force upon an opposite axial movement, means on the stem positioned to positively engage the plug and move the same axially only with reference to the body during such opposite axial movement of the stem, and independent means connecting the stem and plug for rotary movement together when the stem is turned to thereby change the relationship of the plug and body passages.

4. A valve comprising a valve body having a hollow bore and passages communicating said bore and a pipe line, a split closure plug within in said bore having a passage therethrough, said plug being rotatable for aligning said passage with the body passages concurrently and for offsetting said passage from the body passages, a closure surface on said plug alignable with one of said body passages when the plug passage is offset therefrom, a rotatable stem operably connected to said plug sections for rotating said plug in said bore, means operable independently of rotation of the stem for moving the plug sections axially, and means to spread said plug sections relatively apart in any position, and passages communicating said body passages with the space between the walls of the body bore and the plug when the plug is in a position intermediate the open and closed positions whereby the bore of said valve and above mentioned means may be flushed with a fluid.

5. A valve comprising a body having a central bore and passages communicating said bore with a pipe line, a rotatable split plug within said central bore, said plug being divided into separated sections and having a passage therethrough for operably communicating the passages in said body when the plug is rotated to one position, the separated sections of said plug lying over the entire openings of the body passages when rotated to another position and being engageable with the wall of the central bore about the openings thereinto of the body passages for blocking the body passages consequent upon movement of the said sections relatively apart when in the last mentioned position, means operable from the outside of the body for rotating the said plug sections to said positions, operating means operable independently of the rotation of said plug sections, separate means engaging opposite ends of said plug sections respectively and operable by said operating means relatively toward and away from each other to spread said plug sections relatively apart and to relieve the spreading pressure and means operable independently of rotation of said plug sections for moving said separate plug sections axially in said bore whereby said sections may be loosened from the walls of said bore preparatory to rotation thereof.

6. A stop valve comprising a body having a central bore and inlet and outlet passages, a split plug coaxial with and rotatably mounted within said bore and arranged for limited axial movement therein, said plug having a transverse bore for communicating said inlet and outlet passages when the plug sections are rotated to predetermined positions, said sections having solid wall portions for closing said passages when the sections are rotated to different predetermined positions, rotatable means for rotating said plug sections to said positions, wedge means relatively movable toward and away from each other and engaging said plug sections for wedging the plug sections relatively apart and against the walls of said body bore when moved in one direction and for relieving the wedging pressure when moved in the opposite direction, a stem operable from the outside of the body independently of the rotatable means for actuating said wedge means, and means operable independently of the rotatable means for moving the plug sections axially of said bore, whereby the plug sections may be moved axially and thereby loosened from the walls of the body bore preparatory to rotation thereof.

7. A stop valve comprising a body having a central bore with inlet and outlet passages, a closure plug coaxial with and rotatable within said bore, rotatable means for rotating said plug, said plug comprising a plurality of separated sections and having a bore therethrough adapted to be aligned with and offset from the inlet and outlet passages concurrently consequent upon rotation of said plug by said rotatable means, said plug being movable axially in said bore, a stem mounted in an end wall of said body and movable from the outside of the body axially in opposite directions independently of the operation of said rotatable means, coacting shoulders on said stem and plug sections arranged to exert axial pressure only on said plug sections consequent upon outward movement of said stem, means operable by inward movement of said stem for spreading the plug sections apart and by outward movement of the stem for relieving the spreading pressure, and means cooperating with the opposite end of the body and with the plug sections for limiting radial inward movement of the plug sections when the spreading pressure is relieved.

8. A stop valve comprising a body having a central bore and inlet and outlet passages, a rotatable split plug within said bore, said plug being arranged for movement axially of the body bore, and means for rotating said plug, said plug comprising a plurality of separated sections having a transverse bore alignable with the inlet and outlet passages of the body in one position of said plug and said sections having closed areas adapted to close the body passages when the plug is rotated to another position, a stem coaxial with said plug and arranged to be moved inwardly and outwardly axially in the body independently of the operation of said first mentioned means, coacting wedges in said body and on said stem respectively engageable with said plug sections, said wedges moving the plug sections relatively apart when the stem is moved axially inwardly of the body and releasing the wedging action when the stem is moved outwardly, and means engaging the plug sections for moving the same axially consequent upon movement of the stem in the direction for releasing the wedges past the wedge releasing position, said last named means being operable while the plug sections remain in a fixed circumferential position relative to said bore.

9. A stop valve comprising a body having a central bore with inlet and outlet passages, a split plug coaxial with and rotatable within said bore and adapted for limited axial movement therein, means for rotating said plug sections, said plug sections having a passage communicating said inlet and outlet passages in a predetermined position of the plug sections and having imperforate wall portions for closing said passages in another position of said plug sections, a wedge in one end of the body projecting inwardly of the body into the body bore, complementary wedge surfaces at one end of said plug sections engageable therewith, a stem movable axially from the outside of the body independently of rotation of said first mentioned means, a wedge carried by said stem, complementary wedge surfaces at the other end of said plug sections engageable therewith, said wedges moving the plug sections relatively apart consequent upon axial movement of the stem in one direction and relieving the wedging pressure consequent upon axial movement in the opposite direction, a shoulder on said stem, a complementary shoulder on the plug sections engageable with the stem shoulder when the stem is moved in the wedge releasing direction past the wedge releasing position for moving the plug sections axially preparatory to rotation thereof.

MICHAEL SMOLENSKY.